United States Patent [19]

Theno

[11] 4,076,895
[45] Feb. 28, 1978

[54] TRANSPARENT MULTI-LAYERED FILM AND PROCESSES THEREFOR

[75] Inventor: Mark Henry Theno, Anoka, Minn.

[73] Assignee: Champion International Corporation, Stamford, Conn.

[21] Appl. No.: 683,253

[22] Filed: May 5, 1976

[51] Int. Cl.² .................. B05B 5/00; B05D 3/12; B05D 3/00; B32B 27/08
[52] U.S. Cl. .................. 428/516; 156/244; 427/161; 427/336; 427/341; 427/365; 427/398 A; 427/398 B; 427/428; 428/523
[58] Field of Search ........... 427/161, 194, 246, 336, 427/340, 341, 342, 365, 366, 398 A, 398 B, 428; 418/114, 115, 116, 117, 118; 428/516, 523; 156/244

[56] References Cited

U.S. PATENT DOCUMENTS

| | | |
|---|---|---|
| 2,771,388 | 11/1956 | Rocky et al. .................. 156/242 |
| 2,955,970 | 10/1960 | Rice et al. .................. 427/428 X |
| 2,989,414 | 6/1961 | Pecker .................. 427/336 X |
| 3,075,868 | 1/1963 | Long .................. 156/82 |
| 3,077,428 | 2/1963 | Heuser et al. .................. 156/244 X |
| 3,194,677 | 7/1965 | Schwarz et al. .................. 427/336 X |
| 3,389,036 | 6/1968 | Rudolph et al. .................. 427/428 X |
| 3,850,790 | 11/1974 | Denervaud .................. 428/335 X |

Primary Examiner—Michael R. Lusignan
Attorney, Agent, or Firm—Evelyn M. Sommer

[57] ABSTRACT

A process is provided for imparting transparency to a multi-layered polymeric film comprising passing a continuous polymeric web into the nip formed by a pair of counter-rotating rolls, one of said rolls being a pressure roll and the other, a chill roll having a matte surface; extruding a molten polymeric film into the nip between said polymeric web and said chill roll to form a multi-layered film, while maintaining an inert liquid on at least that portion of the chill roll which contacts said extruded film.

10 Claims, 2 Drawing Figures

U.S. Patent  Feb. 28, 1978  4,076,895
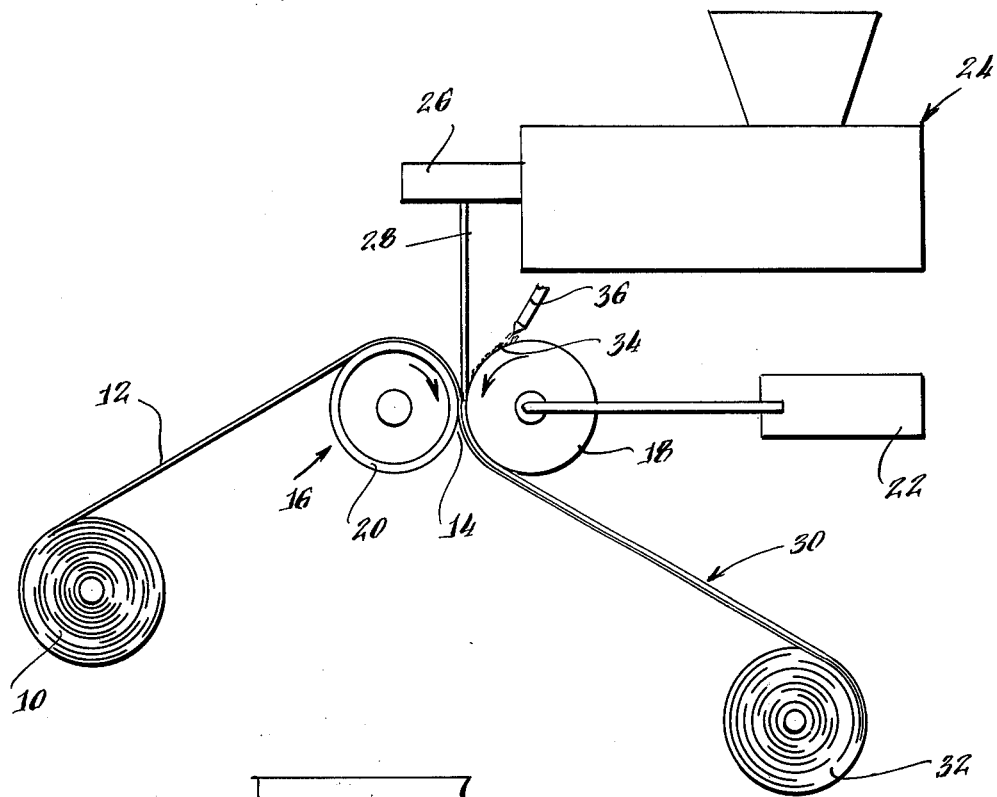
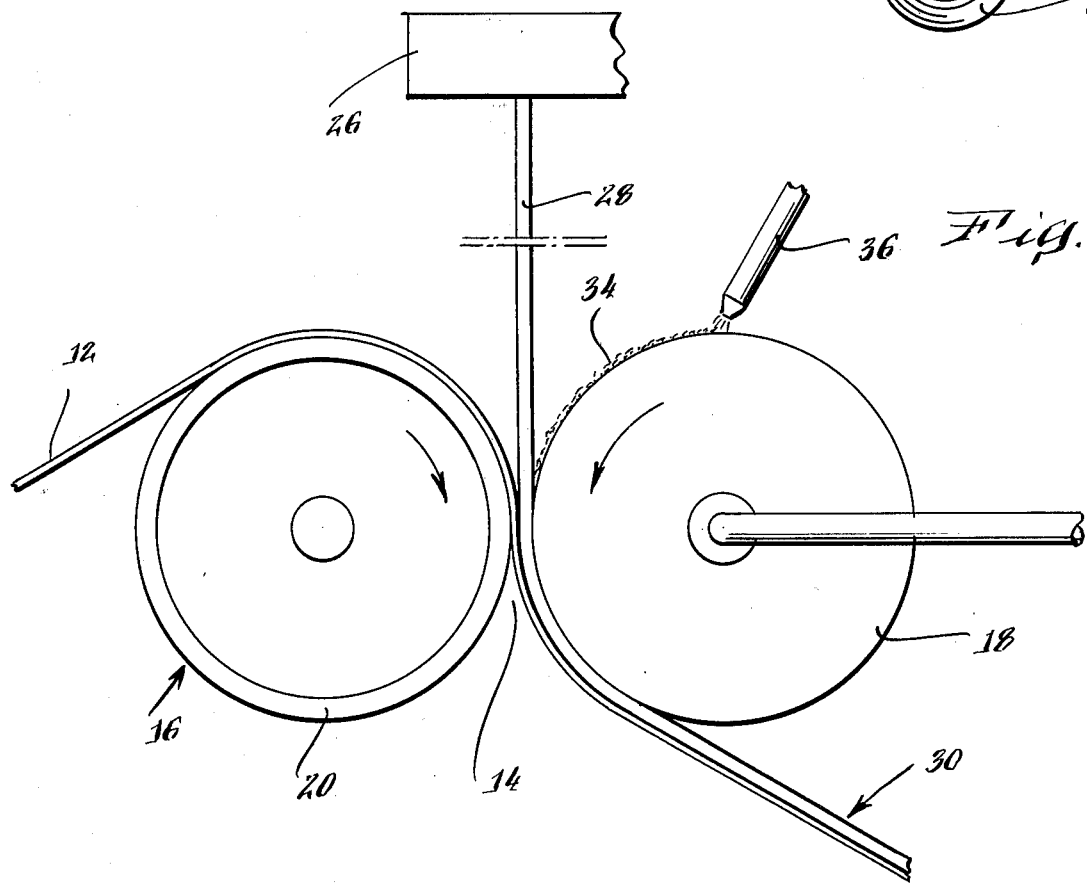

TRANSPARENT MULTI-LAYERED FILM AND PROCESSES THEREFOR

This invention relates to an improved extrusion coating process. More particularly, this invention relates to an improved extrusion coating process which enables the fabrication of multi-layered films of enhanced transparency.

Despite the many new homopolymers and copolymers developed in recent years, a monolithic film has yet to be produced which features the optimum blend of desirable packaging properties, e.g., transparency, water vapor barrier properties, gas barrier properties, toughness, durability, machineability and economical cost for the combination of properties provided. Moreover, each product requires its own particular optimization of performance values plus special characteristics such as printability, heat sealability, stretch and/or shrink capabilities and the like.

In order to overcome property deficiencies in any given film, multi-layered or composite films have been developed thereby offering the ability to tailor a desired combination of properties previously unattainable in simple homopolymeric or copolymeric films.

Generally, multi-layered films can be produced by co-extruding the respective polymers simultaneously and bringing the extrudates into contact while still in an amorphous, semi-molten state by the use of two or more extruders and compound dies. Alternatively, multi-layered films can be prepared by extrusion coating of one polymeric material upon a preformed web of another polymeric material. Other techniques can also be employed to obtain adhesion of an extruded polymeric material upon a preformed web, e.g., by corona treatment of the web or application of an adhesive thereto.

These multi-layered films enable the obtainment of packaging materials exhibiting tailored properties; nevertheless, certain deficiencies arise primarily due to the fabrication process employed. Thus, when extrusion coating techniques are employed, particularly when using a chill roll having a matte or roughened, non-mirror surface, the optical clarity of the resulting composite film is reduced and, whereas, each of the respective polymers employed can provide a transparent film alone, the resulting composite film obtained in such an extrusion coating process suffers reduced clarity to the point of translucency and sometimes, even approaches opacity. The reason for this reduction in transparencey is not fully understood but may, to some degree, be attributable to the surface reflection produced by the roughened surface imparted to the film coating process.

Accordingly, it is an object of the present invention to provide an improved extrusion coating process for use in the fabrication of multi-layered films.

It is another object of the present invention to provide an improved extrusion coating process resulting in multi-layered films of excellent transparency.

These as well as other objects are accomplished by the present invention which provides a process for imparting transparency to a multi-layered film comprising passing a continuous polymeric web into the nip formed by a pair of counter-rotating rolls, one of said rolls being a pressure roll and the other, a chill roll having a matte surface; extruding a molten polymeric film into the nip between said polymeric web and said chill roll to form a multilayered film, while maintaining an inert liquid film on at least that portion of the chill roll which contacts said extruded film.

The present invention will become more apparent upon consideration of the ensuing discussion and the attached drawing wherein:

FIG. 1 represents a schematic illustration of one embodiment of the improved extrusion coating process of the present invention; and FIG. 2 is a schematic illustration enlarging the region surrounding the nip in the extrusion coating process shown in FIG. 1.

Referring to FIG. 1, there is shown a feed roll 10 which contains a pre-formed continuous transparent polymeric substrate or web 12. Polymeric web 12 is fed into the nip 14 formed by a pair of counter-rotating rolls, one of said rolls 16 being a pressure roll, and the other roll 18, a chill roll having a non-mirror finish, i.e., a matte surface. The pressure roll 16 can be a solid roll, a rubber coated metal roll, a metal roll having a highly polished surface and preferably, a poly(tetrafluoroethylene)coating 20 on a rubber roll. The chill roll 18 is generally a cored metal roll having a matte surface and is adapted to receive and circulate a chilled fluid therethrough from heat exchanger 22. Extruder 24 passes molten polymer under pressure through flat film die 26 forming polymeric film 28 which is passed into the nip 14 between polymeric web 12 and chill roll 18 to form a multi-layered film 30 comprising the polymeric web 12 having a thin coating of polymeric film 28 thereon. If desired, or necessary, the polymeric web can be first treated such as with corona discharge, an adhesive primer or other conventional treatments for improving the adhesion of the extrudate to the polymeric web. The resulting multi-layered film 30 is passed to take-up roll 32.

It has heretofore been found that the multi-layered film produced by the above-described process lacks optical clarity. Depending upon the particular film components employed, the resultant multi-layered film can range from translucent to nearly opaque. Surprisingly, it has now been found that if an inert liquid film 34 (as best seen in FIG. 2, wherein identical numerical designations as in FIG. 1 are employed) is maintained on at least that portion of the chill roll 18 that contacts the extrudate 28, a highly transparent multi-layered film is obtained. Any material which is a liquid under ambient conditions and which is inert with respect to the polymeric materials employed can be suitably used, for example, water, alcohols such as ethanol, iso-propanol and the like, aqueous sodium lauryl sulfate, and mixtures thereof.

An inert liquid film can be maintained on the chill roll by spraying a liquid in the form of a stream, spray or mist directly onto the chill roll such as with spraying means 36. Alternatively, the liquid film can be maintained by a variety of conventional techniques such as roller coating, padding, partial immersion of the chill roll in a bath of the liquid and the like. If ambient conditions surrounding the chill roll 18 are such that the temperature and humidity conditions cause "sweating", a film of moisture will be self-generating. Sweating will occur on the surface of the metal chill roll when the air temperature drops below the dew point. The inert liquid film need be present on only that portion of the chill roll in the region entering the nip, however, for convenience or simplicity of operation, a liquid film can be maintained on the entire roll surface. Care should be exercised to avoid a build up of liquid in the nip. This is easily accomplished through use of a doctor blade or other similar film thickness regulation techniques.

Any pre-formed, continuous, transparent, polymeric web can be employed in the present invention. These webs can be preformed by any conventional film-forming technique such as casting, extrusion, calendering and the like. The web employed must be transparent, self-supporting and not undergo degradation or distortion upon contact with the molten extrudate. Generally, oriented polypropylene, cellophane, polyesters, e.g. polyethylene terephthalate, nylon 6, nylon 66, biaxially oriented nylon, poly(vinyl acetate), cellulose acetate, polystyrene, poly(vinyl chloride), poly(vinylidene chloride) and the like can be suitably employed.

Any extrudable polymer can be employed to form the molten polymeric films of the present invention including ethylene vinyl acetate copolymers, ionomers such as the Surlyn resins (available from E. I. du Pont de Nemours & Co., Inc., Wilmington, Delaware), poly(vinylidene chloride), polyethylene, ethylene acrylic acid copolymers, hot melt resins such as ethylene/acrylic acid ester copolymers such as ethylene/ethyl acrylate, ethylene/methyl acrylate and the like. The extrudate should possess sufficient residual heat upon contacting the continuous polymeric web in the nip to effect bonding therewith upon exposure to the pressures encountered while traversing the nip.

Employing the process of the present invention, highly transparent multi-layered films are conveniently obtained. Illustrative of the multi-layered films of enhanced transparency obtained in accordance with the present invention are such compoisite films are ionomer/polypropylene, ionomer/nylon, ionomer/polyester, e.g., polyethylene terephthalate, polyethylene/poly(vinylidene chloride), polypropylene/poly(vinylidene chloride), polyethylene/nylon, polyethylene/cellophane, ethylene-vinyl acetate/polypropylene, ethylene-vinyl acetate/polyethylene, polyethylene/polyester and the like.

The following example further illustrates the present invention. Unless otherwise stated, all percentages and parts are by weight.

Transparent polypropylene film (Hercules B-502) having a thickness of 0.5 mil was coated with an extrudate of Surlyn ionomer resin (DuPont Surlyn 1652) to a coating weight of 15 lbs./ream. The polypropylene film was fed from a feed roll through the nip formed between a pair of counter-rotating rolls, one being a Teflon (registered trademark of E. I. du Pont de Nemours & Co., Inc.) polytetrafluoroethylene coated rubber pressure roll and the other a chill roll having a matte surface, and then passed to a wind up roll. The unwind tension on the feed roll was maintained at 15 psi; whereas, the wind up tension of the wind up roll was maintained at 8 psi. The chill roll was maintained at a temperature of 80° F. The air pressure on the pressure roll was 60 psi. The line was run at a line speed of 150 ft.min. The Surlyn ionomer resin was extrusion coated onto the polypropylene film by passing the extrudate into the nip between the polypropylene film and the chill roll. The extruder employed was an Egan 2 ½ inches extruder run at an 80 rpm screw speed and a back pressure of 600 psi. The barrel temperature set points ranged from 400° F. to 600° F and the temperature within the flat film die ranged from 590° F. to 600° F.

Under these conditions, the resulting composite film exhibited a translucent "frosted" appearance. When, however, water was sprayed onto the top of the chill roll forming a continuous film of water across the chill roll in the region of the nip, a highly transparent composite film was obtained.

A comparison of the transparency of the composite film obtained in accordance with the present invention and the control obtained without the application of water on the chill roll was conducted employing the following transparency test (U.S. Military Standards 101):

A ring stand having a ring clamp thereon was set upon a piece of white paper containing black type thereon having a height of 5 mm. The ring clamp is initially set at a height at which the lettering on the paper is not readable. The clamp is then moved closer to the paper until the lettering is first readable.

A sample of composite film obtained without the application of moisture to the chill roll was placed on the ring clamp. The ring clamp was then adjusted until the lettering on the paper could be clearly seen therethrough. The resulting distance between the ring clamp and paper was 1.4 cm (0.55 in.).

The same procedure was repeated using a sample of composite film obtained in accordance with the present invention. The distance between the ring clamp and the paper at which the lettering on the paper could be clearly seen therethrough was 88.9 cm (35 inches).

This comparison readily illustrates the significant transparency imparted to the composite film in accordance with the present invention.

What is claimed is:

1. Process for imparting transparency to a multi-layered polymeric film comprising passing a continuous polymeric web into the nip formed by a pair of counter-rotating rolls, one of said rolls being a pressure roll and the other, a chill roll having a matte surface; extruding a molten polymeric film into the nip between said polymeric web and said chill roll to form a multi-layered film, while maintaining an inert liquid film on at least that portion of the chill roll which contacts said extruded film.

2. Process as defined in claim 1 wherein the pressure roll includes a poly(tetrafluoroethylene) coating thereon.

3. Process as defined in claim 1 wherein the inert liquid is water.

4. Process as defined in claim 1 wherein the inert liquid is an alcohol.

5. Process as defined in claim 1 wherein the inert liquid is an aqueous solution of sodium lauryl sulfate.

6. Process as defined in claim 1 wherein the inert liquid film is maintained on the chill roll by spraying water onto the chill roll in the region of the nip.

7. Process as defined in claim 1 wherein the inert liquid film is maintained on the chill roll by maintaining the air temperature surrounding the chill roll below the dew point.

8. Process as defined in claim 1 wherein the continuous polymeric web comprises polypropylene film.

9. Process as defined in claim 8 wherein the molten polymeric film is formed from an ionomer resin.

* * * * *